United States Patent
Ganzel et al.

(10) Patent No.: US 12,139,119 B2
(45) Date of Patent: Nov. 12, 2024

(54) HYDRAULIC BRAKE WEAR DETECTION APPARATUS AND METHOD

(71) Applicant: ZF Active Safety US Inc., Livonia, MI (US)

(72) Inventors: Blaise J. Ganzel, Ann Arbor, MI (US); Jeffrey E. Shaya, Farmington Hills, MI (US)

(73) Assignee: ZF Active Safety US Inc., Livonia, MI (US)

( * ) Notice: Subject to any disclaimer, the term of this patent is extended or adjusted under 35 U.S.C. 154(b) by 466 days.

(21) Appl. No.: 17/489,004

(22) Filed: Sep. 29, 2021

(65) Prior Publication Data

US 2023/0096418 A1     Mar. 30, 2023

(51) Int. Cl.
     *B60T 17/22*      (2006.01)
     *B60T 1/06*      (2006.01)
     (Continued)

(52) U.S. Cl.
     CPC ............ *B60T 17/221* (2013.01); *B60T 1/065* (2013.01); *B60T 13/148* (2013.01); *B60T 13/58* (2013.01);
     (Continued)

(58) Field of Classification Search
     CPC .... B60T 17/221; B60T 13/148; B60T 13/686; B60T 13/58; B60T 1/065; F16D 66/027;
     (Continued)

(56) References Cited

U.S. PATENT DOCUMENTS 3,476,220 A * 11/1969 Toyoaki .................. B60T 11/24
                                                       188/106 R
3,804,212 A * 4/1974 Haraikawa .............. F16D 65/18
                                                        188/72.4
(Continued)

FOREIGN PATENT DOCUMENTS

DE     102016218022 A1    3/2018
DE     112013004300 B4    6/2020
(Continued)

OTHER PUBLICATIONS

German Search Report, pp. 1-14, related to Application 102022209867.6, with a mailing date of Jul. 27, 2023. English translation not provided.

*Primary Examiner* — Ishal R Sahni
(74) *Attorney, Agent, or Firm* — Kristin L. Murphy (57) ABSTRACT

A hydraulic brake wear detection apparatus and a method for detecting a degree of pad wear of a brake pad of a hydraulic brake includes a caliper piston located at least partially within a caliper cavity and attached to the brake pad. The caliper piston includes a piston cavity extending from a caliper piston rim into a caliper piston body at a location longitudinally opposite, and spaced from, the brake pad. An internal piston is located at least partially within the piston cavity and is entirely enclosed in an internal space defined cooperatively by the piston cavity and the caliper cavity for reciprocal longitudinal motion with respect to the internal space. The internal piston is reciprocated by a predetermined volume of pressurized hydraulic fluid responsive to wear of the brake pad.

8 Claims, 4 Drawing Sheets

(51) Int. Cl.
  *B60T 13/14*  (2006.01)
  *B60T 13/58*  (2006.01)
  *B60T 13/68*  (2006.01)
  *F16D 55/226*  (2006.01)
  *F16D 65/74*  (2006.01)
  *F16D 66/02*  (2006.01)
  *B60T 7/04*  (2006.01)
  *B60T 7/12*  (2006.01)
  *F16D 121/04*  (2012.01)
  *F16D 125/08*  (2012.01)
  *F16D 125/10*  (2012.01)

(52) U.S. Cl.
  CPC .......... *B60T 13/686* (2013.01); *F16D 55/226* (2013.01); *F16D 65/74* (2013.01); *F16D 66/027* (2013.01); *F16D 66/028* (2013.01); *B60T 7/042* (2013.01); *B60T 7/12* (2013.01); *B60T 2270/406* (2013.01); *B60T 2270/82* (2013.01); *B60T 2270/88* (2013.01); *F16D 2121/04* (2013.01); *F16D 2125/08* (2013.01); *F16D 2125/10* (2013.01)

(58) Field of Classification Search
  CPC ...... F16D 66/028; F16D 65/74; F16D 55/226; F16D 2121/04
  See application file for complete search history.

(56) References Cited

U.S. PATENT DOCUMENTS

| | | | | |
|---|---|---|---|---|
| 4,161,239 | A | * | 7/1979 | Karasudani ............. F16D 65/18 188/106 P |
| 5,072,811 | A | * | 12/1991 | Everhard ................ F16D 65/18 92/52 |
| 2009/0242334 | A1 | * | 10/2009 | Moore .................... F16D 65/18 188/24.22 |
| 2013/0068572 | A1 | * | 3/2013 | Isono ........................ B60T 1/06 188/72.3 |
| 2016/0325724 | A1 | * | 11/2016 | Lee ........................... B60T 8/32 |
| 2020/0023825 | A1 | * | 1/2020 | Mitchell ............... B60T 13/746 |
| 2022/0260127 | A1 | * | 8/2022 | Xing .................... F16D 66/023 |

FOREIGN PATENT DOCUMENTS

| | | | |
|---|---|---|---|
| DE | 102018010169 A1 | | 7/2020 |
| DE | 102021002486 A1 | | 7/2021 |
| JP | 2006161899 A | | 6/2006 |
| KR | 20070045840 A | * | 5/2007 |
| KR | 20080043017 A | * | 5/2008 |
| KR | 20220139127 A | * | 10/2022 |

* cited by examiner

HYDRAULIC BRAKE WEAR DETECTION APPARATUS AND METHOD

TECHNICAL FIELD

This disclosure relates to an apparatus and method for hydraulic brake wear detection and, more particularly, to a method of, and apparatus for detecting a degree of pad wear of a brake pad of a hydraulic brake including the brake pad, a brake rotor, and a caliper housing at least partially enclosing the brake pad and brake rotor for relative longitudinal motion therebetween,

BACKGROUND

Traditional service braking systems of a vehicle are typically hydraulic fluid based systems actuated by a driver depressing a brake pedal that generally actuates a master cylinder. In turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually actuated master cylinder with supplemental actuation pressure gradients supplied by the hydraulic modulator assembly during anti-lock, traction control, and stability enhancement modes of operation. Hydraulic brake systems are known to include dedicated brake wear sensors (e.g., clip-on sensors) generally placed upon or secured to the brake pad itself for detecting brake wear. Unfortunately, such clip-on sensors may not be robust, are costly, and may require replacement with worn brake pads.

More recent brake designs may include brake assemblies with an electromechanical park brake feature as part of the actuator. With such a feature, the driver merely presses a button to electrically actuate the brakes into a park brake mode. Additionally, recent brake system designs may be devoid of any hydraulics. Such systems are often known as brake-by-wire (BBW) systems that electrically actuate the brakes during both service and park brake modes of operation. Such systems with electro-mechanical attributes may still include the clip-on sensors already used for hydraulic systems to determine brake pad wear, with the same disadvantages thereof.

SUMMARY

In an aspect, a hydraulic brake wear detection apparatus for detecting a degree of pad wear of a brake pad of a hydraulic brake is disclosed. The hydraulic brake includes the brake pad, a brake rotor, and a caliper housing at least partially enclosing the brake pad and brake rotor for relative longitudinal motion therebetween. The caliper housing defines a caliper cavity in selective fluid communication with a reservoir of brake fluid and with a source of pressurized hydraulic fluid via a caliper passage. The brake wear detection apparatus comprises a caliper piston located at least partially within the caliper cavity and attached to a first side of the brake pad. The caliper piston is configured for reciprocal longitudinal motion with respect to the brake rotor to selectively place a second side of the brake pad, longitudinally opposite the first side of the brake pad, into contact with the brake rotor to provide a braking action thereto. The caliper piston includes a piston cavity extending from a caliper piston rim into a caliper piston body at a location longitudinally opposite, and spaced from, the brake pad. An internal piston is located at least partially within the piston cavity and is entirely enclosed in an internal space defined cooperatively by the piston cavity and the caliper cavity for reciprocal longitudinal motion with respect to the internal space. The internal piston is reciprocated by a predetermined volume of pressurized hydraulic fluid responsive to wear of the brake pad.

In an aspect, a method of detecting a degree of pad wear of a brake pad of a hydraulic brake is disclosed. The hydraulic brake includes the brake pad, a brake rotor, and a caliper housing at least partially enclosing the brake pad and brake rotor for relative longitudinal motion therebetween. The caliper housing defines a caliper cavity in selective fluid communication with a reservoir of brake fluid and with a source of pressurized hydraulic fluid via a caliper passage. A hydraulic brake wear detection apparatus is provided. The hydraulic brake wear detection apparatus includes a caliper piston located at least partially within the caliper cavity and attached to a first side of the brake pad. The caliper piston includes a piston cavity extending from a caliper piston rim into a caliper piston body at a location longitudinally opposite, and spaced from, the brake pad. The hydraulic brake wear detection apparatus includes an internal piston located at least partially within the piston cavity and entirely enclosed in an internal space defined cooperatively by the piston cavity and the caliper cavity. A normally open venting valve is interposed in the caliper passage hydraulically between the reservoir and both the source of pressurized hydraulic fluid and the caliper cavity. The caliper piston is moved reciprocally longitudinally with respect to the brake rotor to selectively place a second side of the brake pad, longitudinally opposite the first side of the brake pad, into contact with the brake rotor to provide a braking action thereto during a normal non-failure braking mode of operation. The internal piston is moved reciprocally longitudinally with respect to the internal space via a predetermined volume of pressurized hydraulic fluid responsive to wear of the brake pad. The normally open venting valve is selectively closed to isolate the predetermined volume of pressurized hydraulic fluid from the reservoir of brake fluid and thus provide a closed hydraulic loop between the source of pressurized hydraulic fluid and the caliper cavity to place the hydraulic brake wear detection apparatus into a detection mode of operation at least partially having the brake pad advanced into contact with the brake rotor. With the hydraulic brake wear detection apparatus in the detection mode of operation, the internal piston is retracted longitudinally away from the brake rotor into a detection piston position by the provision of negatively pressurized hydraulic fluid to the caliper cavity. With the hydraulic brake wear detection apparatus in the detection mode of operation, the negatively pressurized hydraulic fluid within the caliper cavity is rebalanced to a neutral level. With the hydraulic brake wear detection apparatus in the detection mode of operation, the internal piston is advanced longitudinally toward the brake rotor and out of the detection piston position by provision of the predetermined volume of pressurized hydraulic fluid to the internal space. After the predetermined volume of volume of pressurized hydraulic fluid is in the internal space, the hydraulic brake wear detection apparatus is returned to a service mode of operation. A pad wear status of the brake pad is determined, responsive to the predetermined volume of pressurized hydraulic fluid provided to the internal space with the hydraulic brake wear detection apparatus in the detection mode of operation.

In an aspect, a method of detecting a degree of pad wear of a brake pad of a hydraulic brake is disclosed. The hydraulic brake includes the brake pad, a brake rotor, and a caliper housing at least partially enclosing the brake pad and brake rotor for relative longitudinal motion therebetween. The caliper housing defines a caliper cavity in selective fluid communication with a reservoir of brake fluid and with a single-acting plunger type power transmission unit via a caliper passage. The method includes providing a hydraulic brake wear detection apparatus including a caliper piston located at least partially within the caliper cavity and attached to a first side of the brake pad. The caliper piston includes a piston cavity extending from a caliper piston rim into a caliper piston body at a location longitudinally opposite, and spaced from, the brake pad. The hydraulic brake wear detection apparatus includes an internal piston located at least partially within the piston cavity and entirely enclosed in an internal space defined cooperatively by the piston cavity and the caliper cavity. Pressurized hydraulic fluid is selectively provided via reciprocal longitudinal motion of a plunger of the power transmission unit. A normally open venting valve is interposed in the caliper passage hydraulically between the reservoir and both the power transmission unit and the caliper cavity. The caliper piston is moved reciprocally longitudinally with respect to the brake rotor to selectively place a second side of the brake pad, longitudinally opposite the first side of the brake pad, into contact with the brake rotor to provide a braking action thereto during a normal non-failure braking mode of operation. With the hydraulic brake wear detection apparatus in a detection mode of operation at least partially having the brake pad advanced into contact with the brake rotor:

(1) a predetermined volume of positively pressurized hydraulic fluid is supplied to the caliper cavity,
(2) the normally open venting valve is closed to isolate the predetermined volume of pressurized hydraulic fluid from the reservoir of brake fluid and thus provide a closed hydraulic loop between the power transmission unit and the caliper cavity,
(3) the plunger of the power transmission unit is retracted to responsively move the internal piston in a first longitudinal direction, away from the brake rotor, under influence of negatively pressurized hydraulic fluid,
(4) the normally open venting valve is opened to allow hydraulic fluid from the reservoir to enter at least one of the caliper cavity and the caliper passage responsive to negative pressure therein, thus rebalancing the negatively pressurized hydraulic fluid within the caliper cavity to a neutral level by providing an augmented volume of hydraulic fluid within at least the caliper cavity and the caliper passage,
(5) the normally open venting valve is closed to isolate the augmented volume of hydraulic fluid from the reservoir,
(6) the plunger of the power transmission unit is advanced to responsively move the internal piston in a second longitudinal direction, toward the brake rotor, under influence of positively pressured hydraulic fluid of the augmented volume,
(7) a wear-indicating volume measurement is sensed responsive to the plunger advancement of (6),
(8) advancement of the plunger of the power transmission unit in (6) is ceased responsive to detection of a predetermined hydraulic pressure value in at least one of the caliper cavity, the power transmission unit, and the caliper passage,
(9) the wear-indicating volume measurement is communicated to an electronic control unit, and
(10) a degree of pad wear is determined responsive to the sensed wear-indicating volume measurement.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
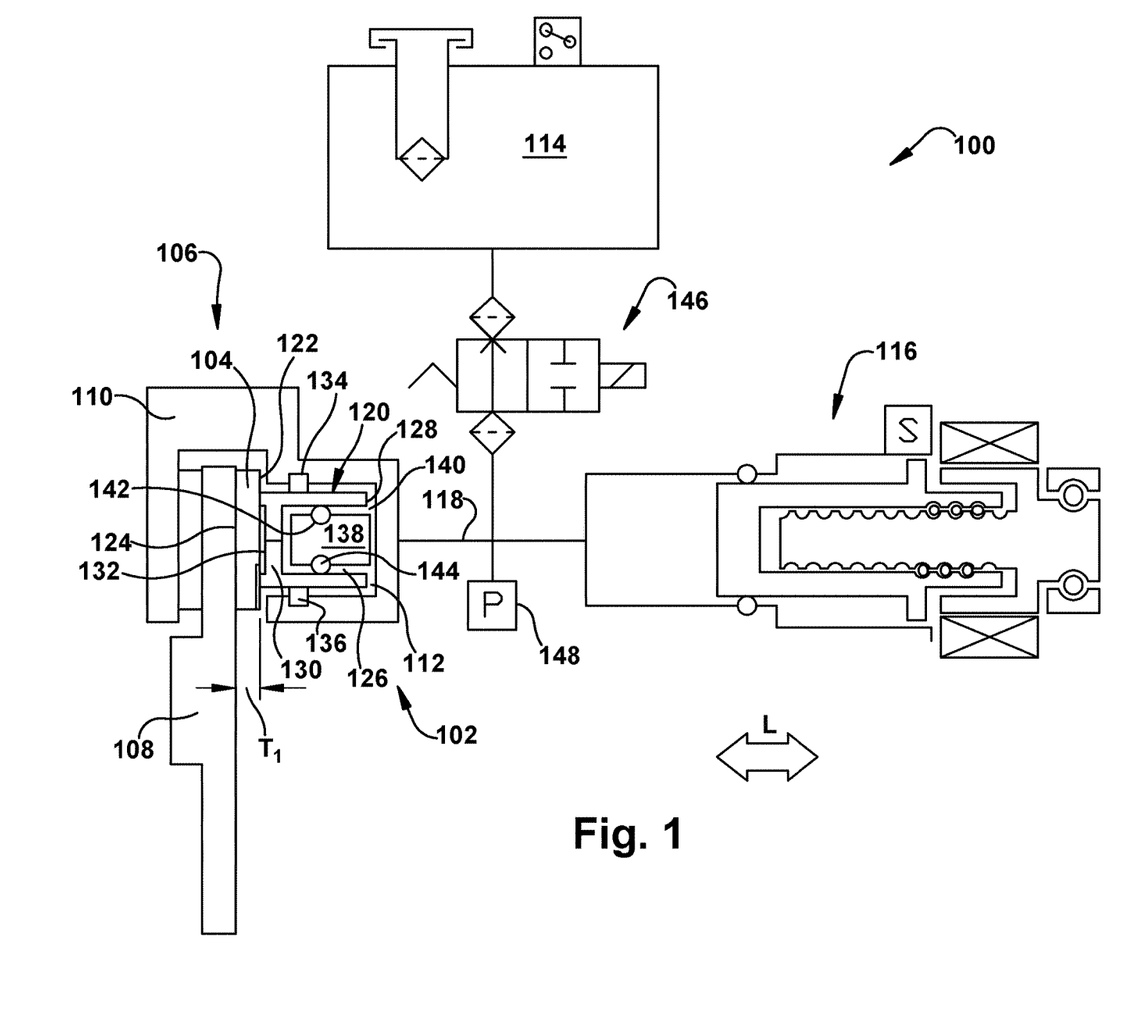
FIG. 1 is a schematic hydraulic diagram of a portion of a brake system including an aspect of the invention, in a first condition.
Figure 2:
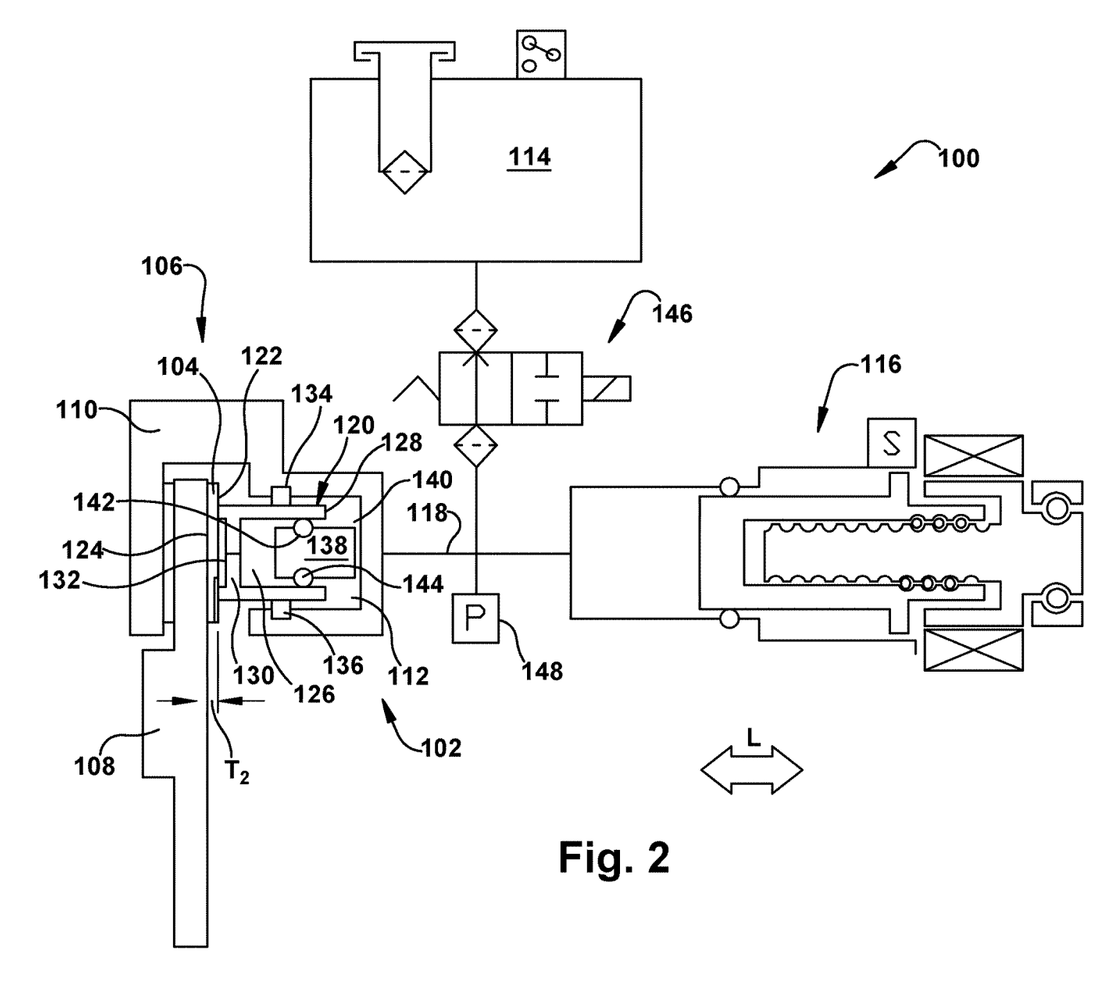
FIG. 2 is a schematic hydraulic diagram of the portion of the brake system of FIG. 1, in a second condition.

FIGS. 1-2 schematically depict a partial view of a brake system 100 including aspects of the present invention. The brake system 100 could be of any desired type such as, but not limited to, the brake system disclosed in U.S. patent application Ser. No. 17/366,682, filed 2 Jul. 2021 by Blaise A. Ganzel and titled "Apparatus and Method for Control of a Hydraulic Brake By Wire System", which is hereby incorporated by reference in its entirety.

The brake system 100 includes a hydraulic brake wear detection apparatus 102 for detecting a degree of pad wear of at least one brake pad 104 of a hydraulic brake 106. (While the brake system 100 shown in the Figures includes two brake pads 104 per brake, one of ordinary skill in the art will appreciate that the present hydraulic brake wear detection apparatus 102 can be used to detect wear of one or more brake pads 104, or other consumable structures, of an associated hydraulic brake 106. The hydraulic brake 106 includes the brake pad 104, a brake rotor 108, and a caliper housing 110 at least partially enclosing the brake pad 104 and brake rotor 108 for relative longitudinal motion therebetween. The "longitudinal" direction, as referenced herein, is substantially parallel to arrow "L", which extends substantially horizontally, in the orientation of FIGS. 1-2. The caliper housing 110 defines a caliper cavity 112 in selective fluid communication with a reservoir 114 of brake fluid and with a source of pressurized hydraulic fluid via a caliper passage 118. The source of pressurized hydraulic fluid may be, for example, a power transmission unit 116 of any desired type configured to provide both negatively and positively pressurized hydraulic fluid. For the sake of description, the power transmission unit 116 will be described herein as being described herein as being a single-acting plunger type power transmission unit 116, but one of ordinary skill in the art will readily be able to provide a suitable source of pressurized hydraulic fluid for a particular use environment.

A caliper piston 120 is located at least partially within the caliper cavity 112 and is attached to a first side 122 of the brake pad 104. The caliper piston 120 is configured for reciprocal longitudinal motion with respect to the brake rotor 108 to selectively place a second side 124 of the brake pad 104, longitudinally opposite the first side 122 of the brake pad 104, into contact with the brake rotor 108 to provide a braking action to the brake rotor 108. The caliper piston 120 includes a piston cavity 126 extending from a caliper piston rim 128 into a caliper piston body 130 at a location longitudinally opposite, and spaced from, the brake pad 104. That is, the caliper piston 120 is of a "cup" shape, with the closed end of the "cup" pressing against the first side 122 of the brake pad 104 to apply the brake. Optionally, and as shown herein, a relief space 132 may be provided to assist with venting of at least a portion of the hydraulic brake 106 as desired (e.g., as shown herein, venting an air pocket that may occur under the internal piston 138).

As shown in the Figures, the caliper housing 110 may include an annular groove 134 in fluid communication with the caliper cavity 112 and circumferentially surrounding the caliper piston body 130. A caliper piston seal 136 is retained at least partially within the annular groove 134 for concurrent contact with the caliper housing 110 and an outer surface of the caliper piston body 130. Also as shown in the Figures, the caliper piston seal 136, when present, may have a substantially square cross section and be configured to bias the caliper piston 120 longitudinally away from the brake rotor 108 under shear force. This known "seal rollback" feature can help pull back the brake pad 104 away from the brake rotor 108 when the braking pressure is released, to end the brake application event.

In addition, in the depicted brake system 100 including the hydraulic brake wear detection apparatus 102, use of the caliper piston seal 136 can allow for intentional "walking" of the caliper piston 120 toward the left, in the orientation of the Figures, as the brake pad 104 wears and thins. This "walking" or shifting of the caliper piston 120 with respect to the caliper piston seal 136 can be seen in the schematic depiction of the relatively unworn brake pad 104 of FIG. 1 to the thinner, more worn brake pad 104 of FIG. 2. It should be noted that the Figures of the present application are not drawn to scale, but the brake pad 104 of FIG. 1 is shown as having a first thickness $T_1$, which is larger than the worn thickness $T_2$ shown in FIG. 2 for the same brake pad 104 after some time period of operation of the brake system 100.

An internal piston 138 of the hydraulic brake wear detection apparatus 102 is located at least partially within the piston cavity 126 formed in the caliper piston 120. The internal piston 138 is entirely enclosed in an internal space 140 defined cooperatively by the piston cavity 126 and the caliper cavity 112. The internal piston 138 is configured for reciprocal longitudinal motion with respect to the internal space 140. For example, and as shown in the Figures, the internal piston 138 may be free-floating within the piston cavity 126. In such an arrangement, the internal piston 138 may be urged longitudinally leftward and rightward (in the orientation of the Figures) within the internal space 140 responsive to flow of pressurized hydraulic fluid into and out of the caliper cavity, respectively.

The internal piston 138 is reciprocated by a predetermined volume of pressurized hydraulic fluid responsive to wear of the brake pad. That is, a larger quantity of pressurized hydraulic fluid may be utilized to reciprocate the internal piston 138 along a full stroke range of motion when the brake pad 104 is in a more worn condition, than the quantity of pressurized hydraulic fluid which is used to reciprocate the internal piston 138 for a less worn brake pad 104. This distinction will be discussed further below, but is schematically depicted by the difference in available internal space 140 being larger in FIG. 2 (with a relatively more worn brake pad 104) than in FIG. 1 (with a relatively less worn brake pad 104).

At least one of an internal wall of the piston cavity 126 and an external surface of the internal piston 138 may include an annular groove 142 in fluid communication with the internal space 140 of the piston cavity 126 and circumferentially surrounding the internal piston 138. An internal piston seal 144 may be retained at least partially within the annular groove 142, when present, for concurrent contact with the internal wall of the piston cavity 126 and the external surface of the internal piston 138. The internal piston seal 144, when present, may be configured to have lower frictional drag on the "sealed" components than would a seal having a square cross-section, such as the caliper piston seal 136. For example, the internal piston seal 144 may be a lip seal in some use environments of the hydraulic brake wear detection apparatus 102, which could (when present) be oriented to resist passage of relatively high pressure brake fluid directionally, as desired. The internal piston seal 144 assists with centering, guiding, and/or facilitating sliding longitudinal motion of the internal piston 138 with respect to the piston cavity 126.

A normally open venting valve 146 may be interposed in the caliper passage 118 hydraulically between the reservoir 114 and both the source of pressurized hydraulic fluid (here, power transmission unit 116) and the caliper cavity 112. As a result, when present, the normally open venting valve 146 may be selectively closed to isolate the predetermined volume of pressurized hydraulic fluid (which is used to reciprocate the internal piston 138) from the reservoir 114 of brake fluid and thus selectively provide a closed hydraulic loop, containing that predetermined volume of pressurized hydraulic fluid, between the power transmission unit 116 and the caliper cavity 112, as will be described with reference to operation of the hydraulic brake wear detection apparatus 102 below.

A pressure sensor 148, of any desired type, may be provided at any suitable location along the caliper passage 118 for selectively sensing pressure of the hydraulic fluid within that caliper passage 118. The pressure sensor 148 may be particularly helpful in operation of the hydraulic brake wear detection apparatus 102 when the closed hydraulic loop is created by closure of the venting valve 146, as just mentioned.

Figure 3:
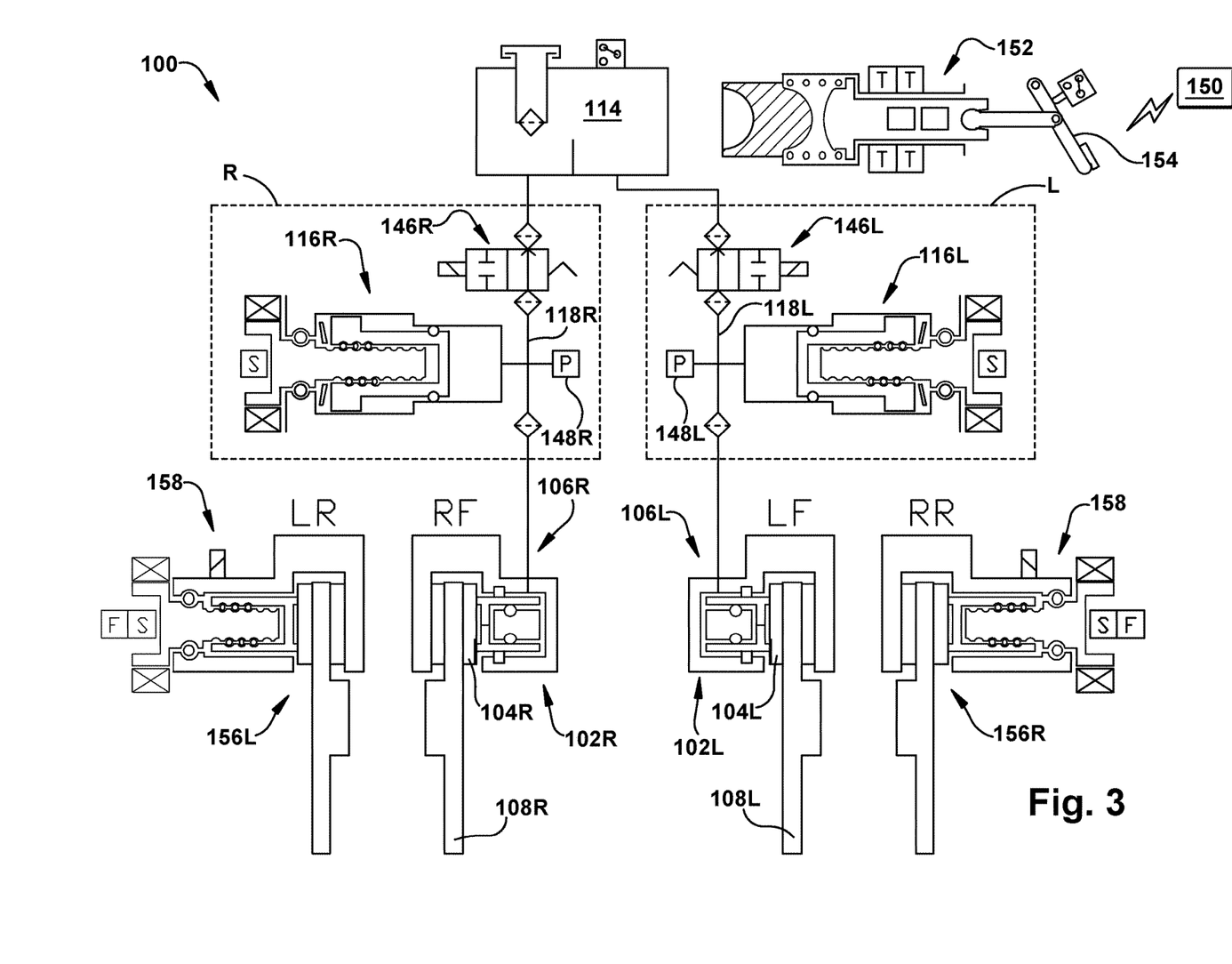
FIG. 3 is a schematic hydraulic diagram of an example brake system including an aspect of the invention.

Turning now to FIG. 3, a brake system 100 including a pair of hydraulic brake wear detection apparatuses 102 as previously described with reference to FIGS. 1-2 is depicted schematically. It is contemplated that one or more hydraulic brake wear detection apparatuses 102 may be provided to a brake system 100, in a symmetrical or asymmetrical manner, as desired for a particular use environment. In the brake system 100 shown in FIG. 3, hydraulic wheel brakes 106R and 106L are operatively associated, respectively, with selected right and left front wheels of a vehicle as labeled. Each of the hydraulic wheel brakes 106 includes the components previously described in FIGS. 1-2 such as, but not limited to, a brake pad 104R, 104L and a brake rotor 108R, 108L.

In the brake system 100 of FIG. 3, a single reservoir 114 is provided for selectively supplying hydraulic fluid to both the left front and right front wheel brakes 106L, 106R. At least one hydraulic brake wear detection apparatus 102L, 102R is interposed hydraulically between the reservoir 114 and the brake pad 104L, 104R of the corresponding hydraulic wheel brake 106L, 106R.

At least one power transmission unit 116 is configured to selectively supply pressurized hydraulic fluid to at least one hydraulic wheel brake 106. At least one normally open venting valve 146 is interposed hydraulically between the reservoir 114 and both a corresponding power transmission unit 116 and a corresponding hydraulic wheel brake 106. At least one pressure sensor 148 is provided to a corresponding caliper passage 118. As shown in FIG. 3 by dashed boxes "R" and "L", the left front hydraulic brake 106L and the right front hydraulic brake 106R are each associated with a corresponding, dedicated set of power transmission unit 116L, 116R, venting valve 146L, 146R, and pressure sensor 148L, 148R, for redundancy, ease of design, ease of control, or for any other desired reason.

An electronic control unit 150 may be provided to the brake system 100 and be configured to control operation of at least one of the power transmission units 116L, 116R, the venting valves 146L, 146R, and the hydraulic wheel brakes 106L, 106R. While one electronic control unit 150 is shown schematically in FIG. 3 as controlling operation of all four wheel brakes in that FIG., it is contemplated that a second electronic control unit, not shown, may be provided for redundancy, ease of control, or any other reason. For example, when a second electronic control unit is provided, each electronic control unit could control one power transmission unit 116L, 116R and the diagonally arranged one of any rear electromechanical brake that is provided.

Also as shown in FIG. 3, the brake system 100 may include a deceleration signal transmitter 152 configured to produce a braking command signal responsive to at least one of actuation by a vehicle operator and actuation by an autonomous vehicle controller (not shown). That is, as shown in FIG. 3, the deceleration signal transmitter 152 may include a brake pedal 154 which is manipulable by a vehicle operator to indicate a desired braking command. The deceleration signal transmitter 152 then translates that desired braking command from the vehicle operator into a braking command signal that is sent, in a wired or wireless manner, to other components of the brake system 100 for use in operating the hydraulic brakes 106 in a normal, non-failure braking mode. Alternatively, and particularly when the brake system 100 is incorporated into an at least partially autonomous vehicle, the autonomous vehicle controller may actuate the deceleration signal transmitter 152 or otherwise generate a suitable braking command signal responsive to a desired application or release of the hydraulic brakes 106 in the autonomous braking mode. The electronic control unit 150, when present, controls at least one of the power transmission units 116L, 116R, the venting valves 146L, 146R, and the hydraulic wheel brakes 106L, 106R responsive to receiving the braking command signal, regardless of the source of that braking command signal.

At least one electromechanical wheel brake 156 may be operatively connected to a wheel of the vehicle spaced apart from a wheel with a corresponding hydraulic wheel brake 106. In other words, the wheel(s) with a hydraulic wheel brake 106 (whether or not a hydraulic brake wear detection apparatus 102 is supplied to that wheel) is/are different from the wheel(s) with an electromechanical wheel brake 156. In the brake system 100 shown in FIG. 3, the electromechanical wheel brakes 156L, 156R are located on the left and right rear wheels of the vehicle, respectively. Each electromechanical wheel brake 156L, 156R, when present, may include a brake motor 158 configured for actuation by the electronic control unit 150 in a known manner responsive to the braking command signal. When two or more electronic control units 150 are provided to the brake system 100, it is contemplated that each electromechanical wheel brake 156 may be controlled by the same electronic control unit 150 as the diagonally-located hydraulic wheel brake 106, for redundancy (e.g., left-front and right-rear by one electronic control unit 150, and right-front/left-rear by a second electronic control unit, when present.

It is contemplated that the brake system 100 may include any desired combination of hydraulic wheel brakes, power transmission unit types, multiplex features, control schemes, and any other configuration as desired by one of ordinary skill in the art for use with the hydraulic brake wear detection apparatus 102.

Figure 4:
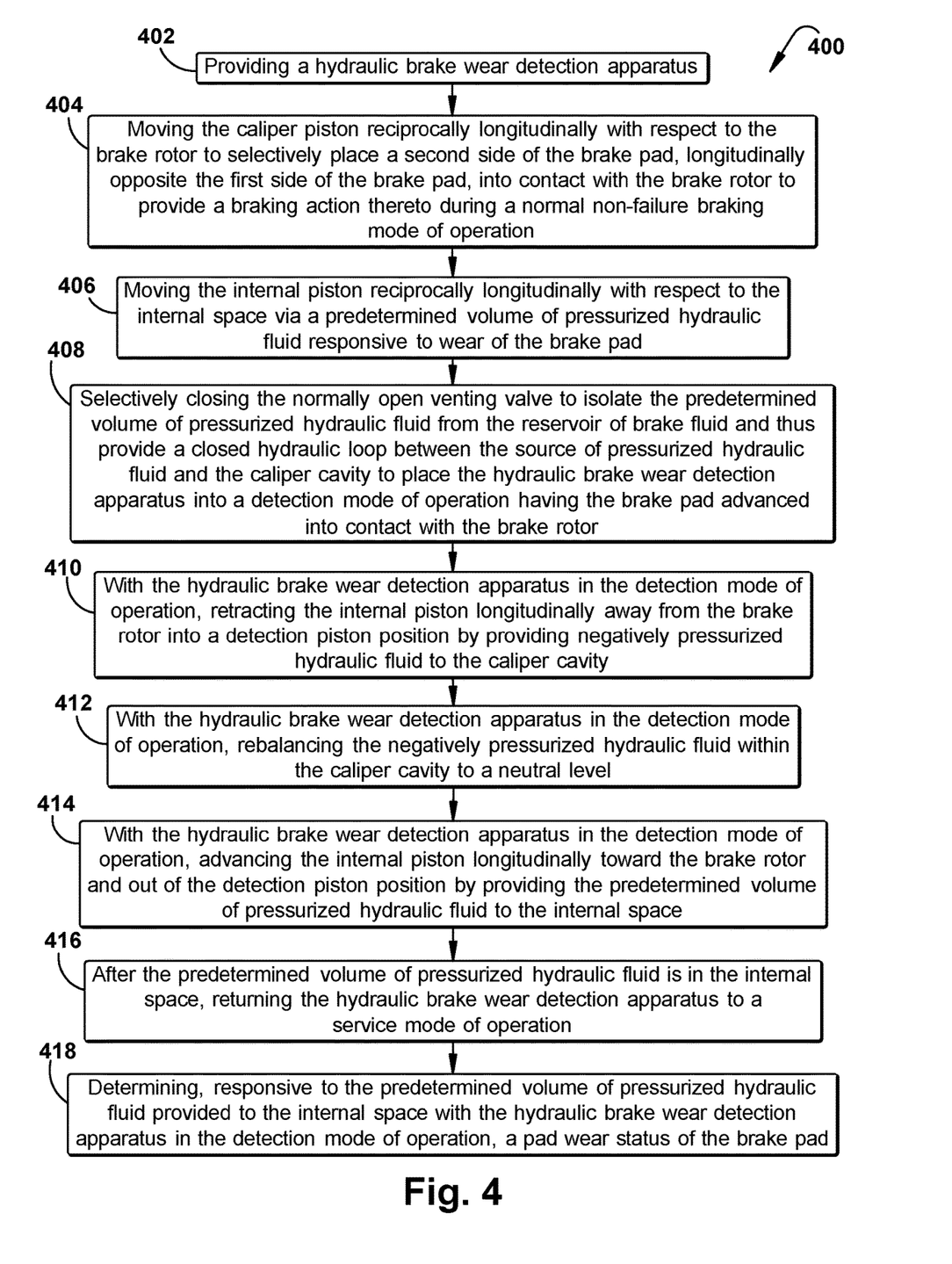
FIG. 4 is a schematic flowchart of an example method for use of the brake system of FIG. 1.

Regardless of the particular nature of the brake system 100, the hydraulic brake wear detection apparatus 102 as depicted in FIGS. 1-3 and described elsewhere herein may be used to carry out a method of detecting a degree of pad wear of a brake pad 104 the hydraulic brake 106. FIG. 4 schematically depicts a flow chart for carrying out at least a portion of a method 400 of using the hydraulic brake wear detection apparatus 102. In the method step 402, a hydraulic brake wear detection apparatus 102 is provided. The above description of the hydraulic brake wear detection apparatus 102 in the brake system 100 in general will largely be omitted with reference to the method 400 herein, for brevity.

The method 400 recognizes that, as previously mentioned, a normally open venting valve 146 is interposed in the caliper passage 118 hydraulically between the reservoir 114 and both the source of pressurized hydraulic fluid (here, the power transmission unit 116) and the caliper cavity 112. In method step 404, the caliper piston 120 is moved reciprocally longitudinally with respect to the brake rotor 108 to selectively place a second side 124 of the brake pad 104, longitudinally opposite the first side 122 of the brake pad 104, into contact with the brake rotor 108. In this way, the brake system 100 provides a braking action to the brake rotor 108, which is used to retard rotational motion of the attached wheel as desired during a normal non-failure braking mode of operation. This method step 404 can include, for example, advancing a plunger of a power transmission unit 116 with the venting valve 146 in a closed position to "push" the caliper piston 120 leftward, in the orientation of FIGS. 1-2, and thereby advance the brake pad 104 toward the brake rotor 108.

In method step 406, the internal piston 138 is moved reciprocally longitudinally in at least one direction with respect to the internal space 140 via a predetermined volume of pressurized hydraulic fluid responsive to wear of the brake pad 104. This reciprocal longitudinal motion of the internal piston 138, as carried by the caliper piston 120 serves to apply and release the hydraulic brake 106 during normal non-failure operation of the braking system 100.

In certain use environments, the internal piston 138 will be located adjacent to, or in contact with, the bottom of the piston cavity 126 "cup" at substantially all times during normal non-failure braking mode of operation of the brake system 100. Since the caliper piston 120 "walks" longitudinally toward the brake rotor 108 as the brake pad 104 wears, one of ordinary skill in the art will understand that, in those selected use environments, the predetermined volume of pressurized hydraulic fluid within the caliper cavity 112 will gradually increase (albeit potentially a very slight increase, depending on dimensions and arrangement of the brake system 100) as the brake pad 104 wears.

It should be noted that, as previously mentioned, a caliper piston seal 136 may be retained at least partially within an annular groove 134 of the caliper housing 110. With the caliper piston seal 136, the caliper piston 120 is biased longitudinally away from the brake rotor 108 under shear force, such as that developed during pressurized application of the brake pad 104 toward the brake rotor 108 during normal non-failure operation of the brake system 100. The "walking" of the caliper piston 120 mentioned in the previous paragraph, as well as earlier in this application, has effective gradually shifting the caliper piston 120 longitudinally toward the brake rotor 108 with respect to the caliper piston seal 136 responsive to wear of the brake pad 104. As a result of this longitudinal shift of the caliper piston 136 toward the brake rotor 108, the internal volume of the caliper cavity 112 increases responsive to a longitudinal shift of the caliper piston 120 toward the brake rotor 108.

In method step 408, the normally open venting valve 146 is selectively closed to isolate the predetermined volume of pressurized hydraulic fluid from the reservoir 114 of brake fluid and thus provide a closed hydraulic loop between the source of pressurized hydraulic fluid (here, the power transmission unit 116) and the caliper cavity 112 to place the hydraulic brake wear detection apparatus 102 into a detection mode of operation. The brake pad 104 is selectively advanced into contact with the brake rotor 108 for at least part of the detection mode of operation.

Turning now to method step 410, with the hydraulic brake wear detection apparatus 102 in the detection mode of operation, the internal piston 138 is retracted longitudinally away from the brake rotor into a detection piston position (shown in FIG. 2) by the provision of negatively pressurized hydraulic fluid to the caliper cavity 112. For example, the power transmission unit 116 could be operated to provide suction upon the caliper passage 120 to pull the internal piston 138 rightward, in the orientation of FIGS. 1-2. When the power transmission unit 116 is of the aforementioned single-acting plunger type, method step 410 may include retracting the plunger of the power transmission unit 116 with the venting valve 146 in a closed position, to urge the internal piston 138 away from the brake rotor 108. The term "negative pressure" is used herein to indicate a fluid pressure below atmospheric pressure, which tends to urge hydraulic fluid away from the affected component and toward a source of such pressure. As a result of this negative pressure or suction, the hydraulic brake wear detection apparatus 102 enters the configuration shown in FIG. 2, the detection mode, with the internal piston 138 spaced apart from the bottom of the "cup" of the piston cavity 126.

In method step 412, and again with the hydraulic brake wear detection apparatus 102 in the detection mode of operation, the negatively pressurized hydraulic fluid within the caliper cavity 112 is rebalanced to a neutral level. This rebalancing may include, for example, selectively opening the venting valve 146 to allow flow of hydraulic fluid from the reservoir 114 through the venting valve 146 and into the caliper passage 118 under negative pressure from the power transmission unit 116, when the plunger thereof is retracted. It should be noted that this rebalancing flow may also or instead facilitate desired collapse of a hydraulic fluid vapor bubble within the system, since the negative pressure application in method step 410 may have resulted in both liquid and vapor forms of the hydraulic fluid being present.

With reference now to method step 414 of FIG. 4, and still with the hydraulic brake wear detection apparatus 102 in the detection mode of operation, the internal piston 138 is advanced longitudinally toward the brake rotor 108 and out of the (rightmost, in the orientation of FIGS. 1-2) detection piston position by providing the predetermined volume of pressurized hydraulic fluid to the internal space 140. For many use environments, the venting valve 146 will be closed before performance of method step 414, to again isolate the reservoir 114 from a "closed loop" comprising the power transmission unit 116, caliper passage 118, and caliper cavity 112. This advancement of the internal piston 138 may be at least partially accomplished, for example, by advancing the plunger of the power transmission unit 116 with the venting valve 146 in a closed position.

It should be noted that the predetermined volume of pressurized hydraulic fluid which is provided to the internal space 140 in method step 414 may be the same as, or different than, a predetermined volume of hydraulic fluid which is provided to various components of the hydraulic brake wear detection apparatus 102 during other phases of operation thereof.

The predetermined volume of pressurized hydraulic fluid provided to the internal space 140 in method step 414 will be described here as a "measured predetermined volume of pressurized hydraulic fluid", since the hydraulic brake wear detection apparatus 102 measures or otherwise determines (directly or indirectly) how much hydraulic fluid is needed to advance the internal piston 138 a predetermined distance toward the brake rotor 108. For example, once the internal piston 138 comes into proximity and/or contact with an internal "cup bottom" surface of the piston cavity 126, further provision of pressurized hydraulic fluid will not move the internal piston 138 further, but will instead cause pressure within at least one of the internal space 140 and the caliper passage 118 to rise. That increase of pressure can be measured (e.g., via pressure sensor 148), and the onset of the increase can be characterized as indicative of the internal space 140 being "full". Since the amount of pressurized hydraulic fluid provided to the caliper passage 118 to move the internal piston 138 is known (e.g., via measurement of movement of the plunger of a single acting plunger-type power transmission unit 116), one of ordinary skill in the art will be able to calculate the amount of longitudinal movement of the internal piston 138 which is allowed for a presently measured brake pad 104 wear condition, as compared to the amount of longitudinal movement of the internal piston 138 which would be permitted when the brake pad 104 is newly installed, and has a maximum thickness.

It is contemplated that the action of method step 414 may, in essence, result in application of the hydraulic brake 106, by moving the caliper piston 120 sufficiently to urge the brake pad 104 toward—even into contact with—the brake rotor 108. As a result, testing of the pad wear thickness via the detection mode of operation of the hydraulic brake wear detection apparatus 102 will often be done when the vehicle carrying the brake system 100 is stopped, and such testing may be accomplished as often as desired. For example, the test may be done about once every ignition cycle of the vehicle, such as at "key-off", when the vehicle is stopped and in a "park" gear.

Returning now to the method shown in FIG. 4, in method step 416, after the (measured) predetermined volume of pressurized hydraulic fluid is in the internal space 140, the hydraulic brake wear detection apparatus 102 is returned to a service, or normal non-failure braking, mode of operation. This return to a service mode of operation may include retraction of the caliper piston 120, such as by the aforementioned rollback of the caliper piston seal 136 and/or by exertion of negative pressure upon hydraulic fluid within the caliper passage 118 by the power transmission unit 116. It is contemplated, though, that for most use environments of the hydraulic brake wear detection apparatus 102, the caliper piston seal 136 will be configured to exert enough friction against the caliper piston 120 during use that exertion of negative pressure will not be sufficient to overcome the seal force and retract the caliper piston 120.

Finally, in method step 418, the hydraulic brake wear detection apparatus 102, or any other suitable component of the brake system 100 (e.g., an electronic control unit 150) or the vehicle may determine, responsive to the (measured) predetermined volume of pressurized hydraulic fluid provided to the internal space 140 with the hydraulic brake wear detection apparatus 102 in the detection mode of operation, a pad wear status of the brake pad 104. That pad wear status of the brake pad 104 could be communicated, in a wired or wireless manner, to at least one of a vehicle operator, an electronic control unit of the vehicle, a vehicle servicer, a vehicle manufacturer, a service database, a log file, or any other suitable recipient for pad wear status information.

In some use environments, a method of detecting a degree of pad wear of a brake pad 104 of a hydraulic brake 106 through use of a hydraulic brake wear detection apparatus 102 such as that shown and described in the present application could be performed, for example, in a manner similar to the following.

Pressurized hydraulic fluid may be selectively supplied via reciprocal longitudinal motion of a plunger of the power transmission unit 116. A normally open venting valve 146 is interposed in the caliper passage 118 hydraulically between the reservoir 114 and both the power transmission unit 116 and the caliper cavity 112. The caliper piston 120 is moved reciprocally longitudinally with respect to the brake rotor 108 to selectively place a second side 124 of the brake pad 104, longitudinally opposite the first side 122 of the brake pad 124, into contact with the brake rotor 108 to provide a braking action thereto during a normal non-failure braking mode of operation.

With the hydraulic brake wear detection apparatus 102 in a detection mode of operation which at least partially has the brake pad 104 advanced into contact with the brake rotor 108, the following steps may be carried out such as, but not limited to, in the numerical order listed:

(1) a predetermined volume of positively pressurized hydraulic fluid is supplied to the caliper cavity 112, (2) the normally open venting valve 146 is closed to isolate the predetermined volume of pressurized hydraulic fluid from the reservoir 114 of brake fluid and thus provide a closed hydraulic loop between the power transmission unit 116 and the caliper cavity 112, (3) the plunger of the power transmission unit 116 is retracted to responsively move the internal piston 138 in a first longitudinal direction, away from the brake rotor 108, under influence of negatively pressurized hydraulic fluid, (4) the normally open venting valve 146 is opened to allow hydraulic fluid from the reservoir 114 to enter at least one of the caliper cavity 112 and the caliper passage 118 responsive to negative pressure therein, thus rebalancing the negatively pressurized hydraulic fluid within the caliper cavity 112 to a neutral level by providing an augmented volume of hydraulic fluid within at least the caliper cavity 112 and the caliper passage 118, (5) the normally open venting valve 146 is closed to isolate the augmented volume of hydraulic fluid from the reservoir 114, (6) the plunger of the power transmission unit 116 is advanced to responsively move the internal piston 138 in a second longitudinal direction, toward the brake rotor 108, under influence of positively pressured hydraulic fluid of the augmented volume, (7) a wear-indicating volume measurement of hydraulic fluid is sensed or otherwise made, in any suitable manner, responsive to the plunger advancement of (6), (8) advancement of the plunger of the power transmission unit 116 in (6) is ceased responsive to detection of a predetermined hydraulic pressure value in at least one of the caliper cavity 112, the power transmission unit 116, and the caliper passage 118, (9) the wear-indicating volume measurement is communicated to an electronic control unit 150, and (10) a degree of pad wear is determined responsive to the sensed wear-indicating volume measurement.

The above example method may include a further step of (11) communicating the determined degree of pad wear to a designated observer.

After the completion of steps (1)-(10), whether or not the communication step of (11) is carried out, the normal non-failure brake mode of operation may be reinstated at least via the steps of:

(12) opening the normally-open venting valve 146 to allow fluid flow between the reservoir 114 and at least one of the power transmission unit 116, the caliper cavity 112, and the caliper passage 118; and (13) retracting the plunger in the first longitudinal direction to draw hydraulic fluid through the normally-open venting valve 146 from the reservoir 114 and thereby refill the power transmission unit 116 for the normal non-failure brake mode of operation.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y.

For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A method of detecting a degree of pad wear of a brake pad of a hydraulic brake including the brake pad, a brake rotor, and a caliper housing at least partially enclosing the brake pad and brake rotor for relative longitudinal motion therebetween, the caliper housing defining a caliper cavity in selective fluid communication with a reservoir of brake fluid and with a source of pressurized hydraulic fluid via a caliper passage, the method comprising:

providing a hydraulic brake wear detection apparatus including
      a caliper piston located at least partially within the caliper cavity and attached to a first side of the brake pad, the caliper piston including a piston cavity extending from a caliper piston rim into a caliper piston body at a location longitudinally opposite, and spaced from, the brake pad, and
      an internal piston located at least partially within the piston cavity and entirely enclosed in an internal space defined cooperatively by the piston cavity and the caliper cavity;
   interposing a normally open venting valve in the caliper passage hydraulically between the reservoir and both the source of pressurized hydraulic fluid and the caliper cavity;
   moving the caliper piston reciprocally longitudinally with respect to the brake rotor to selectively place a second side of the brake pad, longitudinally opposite the first side of the brake pad, into contact with the brake rotor to provide a braking action thereto during a normal non-failure braking mode of operation;
   moving the internal piston reciprocally longitudinally with respect to the internal space via a predetermined volume of pressurized hydraulic fluid responsive to wear of the brake pad;
   selectively closing the normally open venting valve to isolate the predetermined volume of pressurized hydraulic fluid from the reservoir of brake fluid and thus provide a closed hydraulic loop between the source of pressurized hydraulic fluid and the caliper cavity to place the hydraulic brake wear detection apparatus into a detection mode of operation at least partially having the brake pad advanced into contact with the brake rotor;
   with the hydraulic brake wear detection apparatus in the detection mode of operation, retracting the internal piston longitudinally away from the brake rotor into a detection piston position by providing negatively pressurized hydraulic fluid to the caliper cavity;
   with the hydraulic brake wear detection apparatus in the detection mode of operation, rebalancing the negatively pressurized hydraulic fluid within the caliper cavity to a neutral level;
   with the hydraulic brake wear detection apparatus in the detection mode of operation, advancing the internal piston longitudinally toward the brake rotor and out of the detection piston position by providing the predetermined volume of pressurized hydraulic fluid to the internal space;

after the predetermined volume of volume of pressurized hydraulic fluid is in the internal space, returning the hydraulic brake wear detection apparatus to a service mode of operation; and determining, responsive to the predetermined volume of pressurized hydraulic fluid provided to the internal space with the hydraulic brake wear detection apparatus in the detection mode of operation, a pad wear status of the brake pad.

2. The method of claim 1, including communicating the pad wear status of the brake pad to at least one of a vehicle operator, an electronic control unit of the vehicle, and a vehicle servicer.

3. The method of claim 1, wherein the caliper housing includes an annular groove in fluid communication with the caliper cavity and circumferentially surrounding the caliper piston body, and the method includes the steps of:

retaining a caliper piston seal at least partially within the annular groove for concurrent contact with the caliper housing and an outer surface of the caliper piston body; and with the caliper piston seal, biasing the caliper piston longitudinally away from the brake rotor under shear force.

4. The method of claim 3, including:

gradually shifting the caliper piston longitudinally toward the brake rotor with respect to the caliper piston seal responsive to wear of the brake pad; and increasing an internal volume of the caliper cavity responsive to a longitudinal shift of the caliper piston toward the brake rotor.

5. The method of claim 1, wherein the source of pressurized hydraulic fluid is a single acting plunger type power transmission unit, and wherein:

the step of moving the caliper piston reciprocally longitudinally with respect to the brake rotor to provide a braking action thereto during a normal non-failure braking mode of operation includes advancing a plunger of the power transmission unit with the venting valve in a closed position;

the step of retracting the internal piston longitudinally away from the brake rotor into a detection piston position by providing negatively pressurized hydraulic fluid to the caliper cavity includes retracting the plunger of the power transmission unit with the venting valve in a closed position;

the step of rebalancing the negatively pressurized hydraulic fluid within the caliper cavity to a neutral level includes selectively opening the venting valve to allow flow of hydraulic fluid from the reservoir therethrough; and the step of advancing the internal piston longitudinally toward the brake rotor and out of the detection piston position by providing the predetermined volume of pressurized hydraulic fluid to the internal space includes advancing the plunger of the power transmission unit with the venting valve in a closed position.

6. A method of detecting a degree of pad wear of a brake pad of a hydraulic brake including the brake pad, a brake rotor, and a caliper housing at least partially enclosing the brake pad and brake rotor for relative longitudinal motion therebetween, the caliper housing defining a caliper cavity in selective fluid communication with a reservoir of brake fluid and with a single-acting plunger type power transmission unit via a caliper passage, the method comprising:

providing a hydraulic brake wear detection apparatus including a caliper piston located at least partially within the caliper cavity and attached to a first side of the brake pad, the caliper piston including a piston cavity extending from a caliper piston rim into a caliper piston body at a location longitudinally opposite, and spaced from, the brake pad, and an internal piston located at least partially within the piston cavity and entirely enclosed in an internal space defined cooperatively by the piston cavity and the caliper cavity;

selectively providing pressurized hydraulic fluid via reciprocal longitudinal motion of a plunger of the power transmission unit;

interposing a normally open venting valve in the caliper passage hydraulically between the reservoir and both the power transmission unit and the caliper cavity;

moving the caliper piston reciprocally longitudinally with respect to the brake rotor to selectively place a second side of the brake pad, longitudinally opposite the first side of the brake pad, into contact with the brake rotor to provide a braking action thereto during a normal non-failure braking mode of operation;

with the hydraulic brake wear detection apparatus in a detection mode of operation at least partially having the brake pad advanced into contact with the brake rotor:

(1) supplying a predetermined volume of positively pressurized hydraulic fluid to the caliper cavity, (2) closing the normally open venting valve to isolate the predetermined volume of pressurized hydraulic fluid from the reservoir of brake fluid and thus provide a closed hydraulic loop between the power transmission unit and the caliper cavity, (3) retracting the plunger of the power transmission unit to responsively move the internal piston in a first longitudinal direction, away from the brake rotor, under influence of negatively pressurized hydraulic fluid, (4) opening the normally open venting valve to allow hydraulic fluid from the reservoir to enter at least one of the caliper cavity and the caliper passage responsive to negative pressure therein, thus rebalancing the negatively pressurized hydraulic fluid within the caliper cavity to a neutral level by providing an augmented volume of hydraulic fluid within at least the caliper cavity and the caliper passage, (5) closing the normally open venting valve to isolate the augmented volume of hydraulic fluid from the reservoir, (6) advancing the plunger of the power transmission unit to responsively move the internal piston in a second longitudinal direction, toward the brake rotor, under influence of positively pressured hydraulic fluid of the augmented volume, (7) sensing a wear-indicating volume measurement responsive to the plunger advancement of (6), (8) ceasing advancement of the plunger of the power transmission unit in (6) responsive to detection of a predetermined hydraulic pressure value in at least one of the caliper cavity, the power transmission unit, and the caliper passage, (9) communicating the wear-indicating volume measurement to an electronic control unit, and (10) determining a degree of pad wear responsive to the sensed wear-indicating volume measurement.

7. The method of claim 6, including the step of:

(11) communicating the determined degree of pad wear to a designated observer.

8. The method of claim 6, wherein, after the completion of steps (1)-(10), the normal non-failure brake mode of operation is reinstated via the steps of:

(11) opening the normally-open venting valve to allow fluid flow between the reservoir and at least one of the power transmission unit, the caliper cavity, and the caliper passage; and (12) retracting the plunger in the first longitudinal direction to draw hydraulic fluid through the normally-open venting valve from the reservoir and thereby refill the power transmission unit for the normal non-failure brake mode of operation.

\* \* \* \* \*